United States Patent
Lei et al.

(10) Patent No.: US 12,289,777 B2
(45) Date of Patent: Apr. 29, 2025

(54) CONFIGURABLE MODE FOR RESPONSE TO RANDOM ACCESS MESSAGE

(71) Applicant: QUALCOMM Incorporated, San Diego, CA (US)

(72) Inventors: Jing Lei, San Diego, CA (US); Peter Gaal, San Diego, CA (US); Wanshi Chen, San Diego, CA (US); Linhai He, San Diego, CA (US); Ruiming Zheng, Beijing (CN); Yi Huang, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/632,392

(22) PCT Filed: Aug. 4, 2020

(86) PCT No.: PCT/CN2020/106775
§ 371 (c)(1),
(2) Date: Feb. 2, 2022

(87) PCT Pub. No.: WO2021/031841
PCT Pub. Date: Feb. 25, 2021

(65) Prior Publication Data
US 2022/0279575 A1    Sep. 1, 2022

(30) Foreign Application Priority Data

Aug. 16, 2019    (WO) ................ PCT/CN2019/101138

(51) Int. Cl.
*H04W 74/08*    (2024.01)
*H04L 1/00*    (2006.01)
(Continued)

(52) U.S. Cl.
CPC ......... *H04W 74/085* (2013.01); *H04L 1/0061* (2013.01); *H04W 56/0045* (2013.01); *H04W 74/0866* (2013.01); *H04W 76/20* (2018.02)

(58) Field of Classification Search
None
See application file for complete search history.

(56) References Cited

U.S. PATENT DOCUMENTS

| | | | |
|---|---|---|---|
| 10,631,330 B2 | 4/2020 | Vajapeyam et al. | |
| 2017/0325188 A1 | 11/2017 | Dinan | |

(Continued)

FOREIGN PATENT DOCUMENTS

| | | |
|---|---|---|
| CN | 109997405 A | 7/2019 |
| EP | 3691394 A1 | 8/2020 |

(Continued)

OTHER PUBLICATIONS

International Search Report and Written Opinion—PCT/CN2019/101138—ISA/EPO—Apr. 26, 2020.

(Continued)

*Primary Examiner* — Benjamin Lamont
(74) *Attorney, Agent, or Firm* — Patterson & Sheridan LLP

(57) ABSTRACT

Certain aspects of the present disclosure provide techniques for a configurable mode for a response to random access message. A method that may be performed by a user equipment (UE) includes receiving an indication from a base station (BS) that the BS operates according to a first mode in which the BS unicasts a RACH response during a two-step RACH procedure or a second mode in which the BS multicasts the RACH response. The RACH response includes a PDCCH and PDSCH. The UE sends a RACH message to the BS comprising a preamble and payload. The UE monitors and decodes the PDCCH of the RACH (Continued)

response based on the indicated first mode or second mode. The UE decodes the PDSCH of the RACH response and sends feedback to the BS based on the indicated first mode or second mode.

28 Claims, 16 Drawing Sheets

(51) Int. Cl.
    *H04W 56/00*     (2009.01)
    *H04W 74/0833*     (2024.01)
    *H04W 76/20*     (2018.01)

(56) References Cited

U.S. PATENT DOCUMENTS

| | | |
|---|---|---|
| 2018/0288810 A1 | 10/2018 | Ishii |
| 2019/0215101 A1 | 7/2019 | Ko et al. |
| 2019/0230711 A1 | 7/2019 | Fan et al. |
| 2019/0254071 A1 | 8/2019 | Park |
| 2019/0313437 A1* | 10/2019 | Jung ............... H04L 5/0042 |
| 2021/0050947 A1* | 2/2021 | Tsai ............... H04W 72/23 |
| 2021/0329704 A1* | 10/2021 | Yang ............... H04W 72/23 |
| 2021/0352707 A1* | 11/2021 | Maaref ............... H04L 5/0051 |
| 2022/0022259 A1* | 1/2022 | Atungsiri ............... H04L 1/08 |
| 2022/0070938 A1* | 3/2022 | Wu ............... H04L 1/189 |
| 2022/0124825 A1* | 4/2022 | Shi ............... H04W 74/0833 |
| 2022/0141877 A1* | 5/2022 | Ko ............... H04W 74/0833 370/329 |
| 2022/0248453 A1* | 8/2022 | Aiba ............... H04L 5/0094 |
| 2023/0050307 A1* | 2/2023 | Zhou ............... H04W 72/23 |

FOREIGN PATENT DOCUMENTS

| | | |
|---|---|---|
| WO | 2016161408 | 10/2016 |
| WO | 2018085726 A1 | 5/2018 |
| WO | 2018127502 A1 | 7/2018 |
| WO | 2019036221 A1 | 2/2019 |
| WO | 2019064768 A1 | 4/2019 |

OTHER PUBLICATIONS

International Search Report and Written Opinion—PCT/CN2020/106775—ISA/EPO—Oct. 28, 2020.
Nokia, et al., "On 2-Step RACH Procedure", 3GPP Draft, 3GPP TSG RAN WG1 #97, R1-1906747, On 2-Step RACH Procedure, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728198, 23 Pages, Retrieved from the Internet: URL: http://www.3gpp.org/ftp/Meetings%5F3GPP%65FSYNC/RAN1/Docs/R1%2D1906747%2Ezip, [retrieved on May 13, 2019].
Nokia, et al., "On 2-Step RACH Procedure", 3GPP Draft, 3GPP TSG RAN WG1 #96bis, R1-1904716, 3rd Generation Partnership Project (3GPP), Mobile Competence Centre, 650, Route Des Lucioles, F-06921 Sophia-Antipolis Cedex; France, Apr. 8, 2019-Apr. 12, 2019, Apr. 12, 2019 (Apr. 12, 2019), XP051691709, pp. 1-16, Retrieved from the Internet: URL: http://www.3gpp.org/ftp/tsg%5Fran/WG1%5FRL1/TSGR1%5F96b/Docs/R1%2D1904716%2Ezip Chapters 2.1, 2.4-2.6, Sections 2.1, 2.5, figure 2, Section 2.3-2.8.
Supplementary European Search Report—EP20855357—Search Authority—The Hague—Aug. 8, 2023.

* cited by examiner

| RRC State | Successful Decoding of msgA Payload | | Successful Decoding of msgA Preamble Only | |
|---|---|---|---|---|
| | MsgB PDCCH | MsgB PDSCH | MsgB PDCCH | MsgB PDSCH |
| Connected | • DL assignment for MsgB PDSCH<br>• PUCCH resource for HARQ<br>• 1-bit Flag for C-RNTI (set to "1") | • TAC<br>• RRC message (optional)<br>• UL grant for new data (optional) | DL assignment for msgB PDSCH | • Fallback RAR<br>   RAR grant for PUSCH retx<br>   TC-RNTI<br>   RAPID<br>• TAC |
| Inactive or Idle | • DL assignment for MsgB PDSCH<br>• PUCCH resource for HARQ<br>• 1-bit Flag for C-RNTI (set to "0") | • SuccessRAR<br>   Contention resolution ID<br>   C-RNTI<br>• TAC<br>• RRC message (optional)<br>• UL grant for new data (optional) | | |

| RRC State | Successful Decoding of msgA Payload | | Successful Decoding of msgA Preamble Only | | Failure to Detect Preamble |
|---|---|---|---|---|---|
| | MsgB PDCCH | MsgB PDSCH | MsgB PDCCH | MsgB PDSCH | |
| Connected | • DL assignment for MsgB PDSCH<br>• PUCCH resource for HARQ | • TAC<br>• RRC message (optional)<br>• UL grant for new data (optional) | | • Fallback RAR<br>  RAR grant for<br>  PUSCH retx<br>  TC-RNTI<br>  RAPID<br>• TAC | DTX or transmit a BI in a PDSCH MAC subheader |
| Inactive or Idle | • DL assignment for MsgB PDSCH | • SuccessRAR<br>  Contention resolution ID<br>  C-RNTI<br>• TAC<br>• PUCCH resource for HARQ<br>• RRC message (optional)<br>• UL grant for new data (optional) | DL assignment for msgB PDSCH | • Fallback RAR<br>  RAR grant for<br>  PUSCH retx<br>  TC-RNTI<br>  RAPID<br>• TAC | |

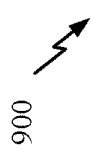

FIG.9

CONFIGURABLE MODE FOR RESPONSE TO RANDOM ACCESS MESSAGE

CROSS-REFERENCE TO RELATED APPLICATION(S)

This application is a national stage application under 35 U.S.C. 371 of PCT/CN2020/106775, filed Aug. 4, 2020, which claims benefit of and priority to International Patent Cooperation Treaty Application No. PCT/CN2019/101138, filed Aug. 16, 2019, which are hereby assigned to the assignee hereof and hereby expressly incorporated by reference herein in their entirety as if fully set forth below and for all applicable purposes.

BACKGROUND

Field of the Disclosure

Aspects of the present disclosure relate to wireless communications, and more particularly, to techniques for a configurable mode for a response to random access message.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved random access procedures.

Certain aspects provide a method for wireless communication by a base station (BS). The method generally includes determining to operate according to a first mode in which the BS unicasts a downlink random access channel (RACH) response message during a two-step RACH procedure or a second mode in which the BS multicasts the downlink RACH response message during the two-step RACH procedure, the downlink RACH response message transmission including a physical downlink control channel (PDCCH) transmission and a physical downlink shared channel (PDSCH) transmission. The method generally includes providing an indication to at least one user equipment (UE) of the determined first mode or second mode.

Certain aspects provide a method for wireless communication by a user equipment (UE). The method generally includes receiving an indication from a BS that the BS operates according to a first mode in which the BS unicasts a downlink RACH response message during a two-step RACH procedure or a second mode in which the BS multicasts the downlink RACH response message during the two-step RACH procedure, the downlink RACH response message transmission including a PDCCH transmission and a PDSCH transmission. The method generally includes sending an uplink RACH message to the BS comprising a RACH preamble and a RACH payload. The method generally includes monitoring and decoding the PDCCH transmission of the downlink RACH response message transmission from the BS based on the indicated first mode or second mode. The method generally includes decoding the PDSCH transmission of the downlink RACH response message transmission and sending a hybrid automatic repeat request (HARQ) feedback to the BS based on the indicated first mode or second mode.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 8 is a table showing MSG A content for a unicast mode, in accordance with certain aspects of the present disclosure.

FIG. 9 is a table showing MSG A content for a multicast mode, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
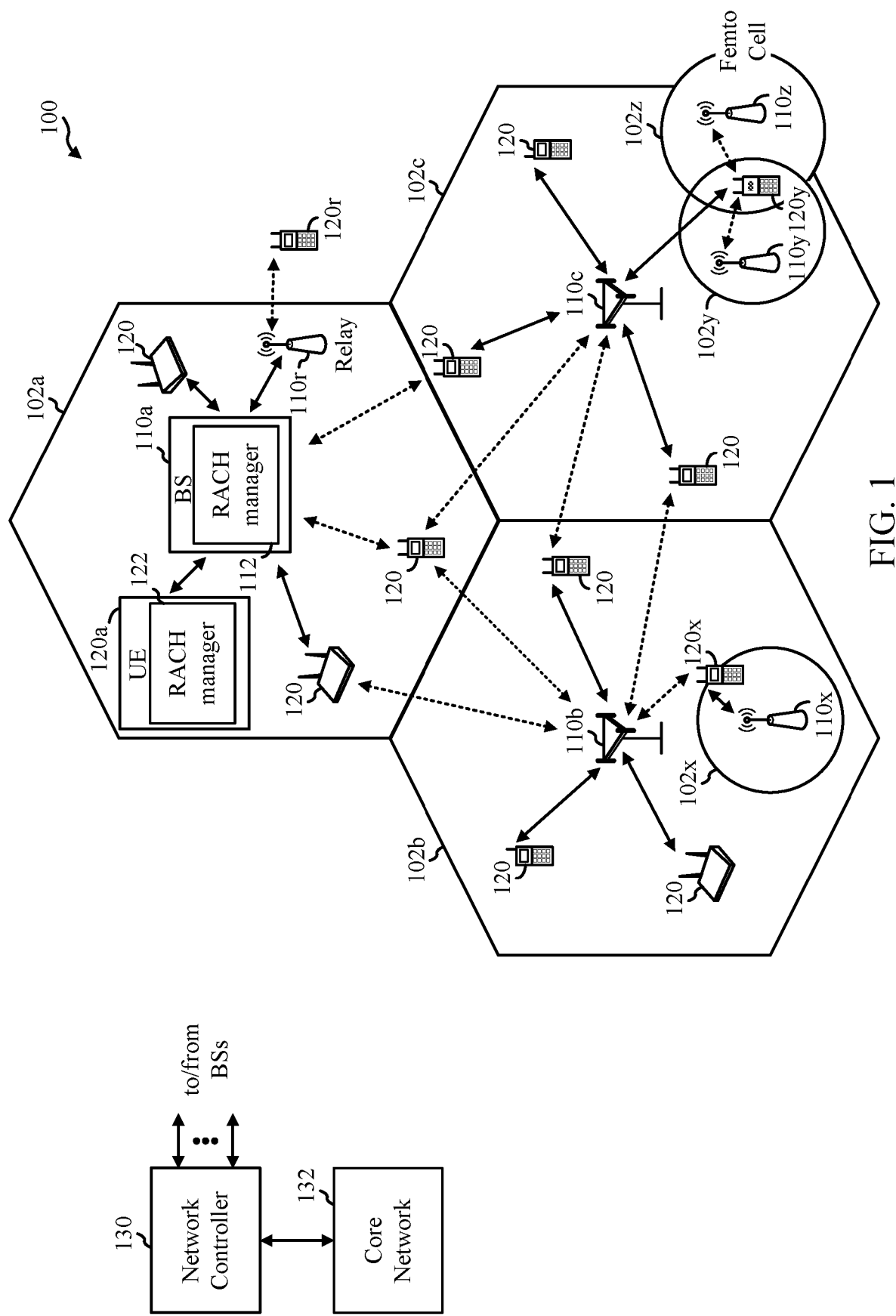
FIG. 1 is a block diagram conceptually illustrating an example telecommunications system, in accordance with certain aspects of the present disclosure.

Aspects of the present disclosure provide apparatus, methods, processing systems, and computer readable mediums for a configurable mode for a response to random access message. In a two-step random access channel (RACH) procedure, user equipment (UE) send a base station (BS) a RACH message (e.g., referred to as MSG A) that includes a RACH preamble and a RACH payload. The BS responds with a RACH response message (MSG B) transmission that includes a physical downlink control channel (PDCCH) transmission and a physical downlink shared channel (PDSCH) transmission. Unicasting the RACH response message may allow the BS to send the UE a large payload. However, multicasting the RACH response message can reduce complexity for blind decoding and allow the RACH response message to carry multiple small payloads for multiple UEs.

Aspects of the present disclosure provide for a configurable mode for the RACH response message. For example, the BS can determine to use the unicast mode or multicast mode for sending the RACH response message based on various parameters, such as system loading, cell coverage, and/or resource availability. The BS can indicate the mode to the UE, so the UE can monitor/decode the RACH response message depending on the indicated mode. In addition, the content of the RACH response message may be based on whether the RACH preamble and/or RACH payload were received, as well as based on the radio resource control (RRC) state of the UE.

The following description provides examples of a configurable mode for a response to random access message in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with UEs 120 in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for a two-step RACH with a configurable mode for the RACH response message. As shown in FIG. 1, the BS 110a includes a RACH manager 112. The RACH manager 112 may be configured for a two-step RACH with a configurable mode for the RACH response message, in accordance with aspects of the present disclosure. As shown in FIG. 1, the UE 120a includes a RACH manager 122. The RACH manager 122 may be configured for a two-step RACH with a configurable mode for the RACH response message, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
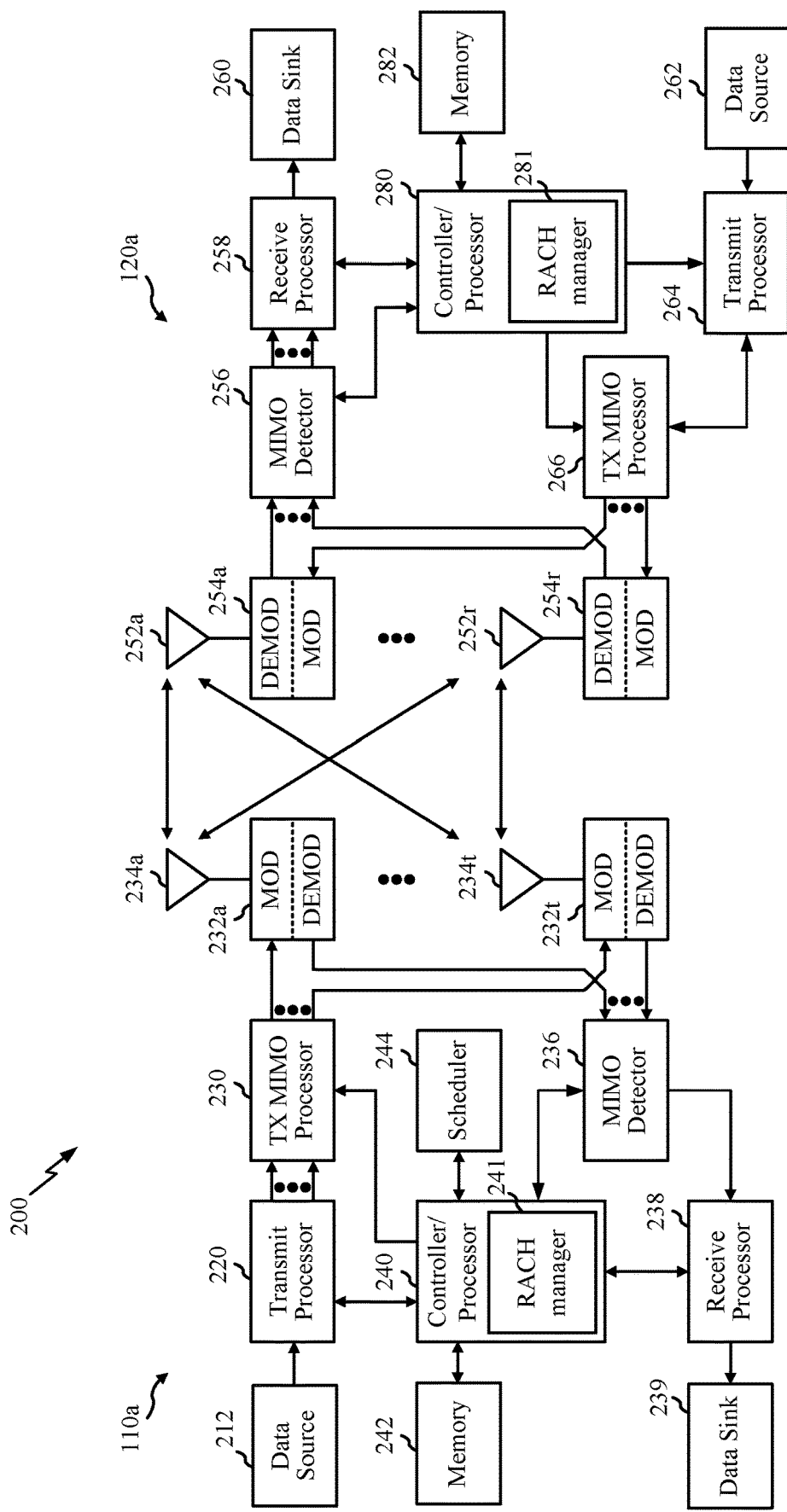
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

The controller/processor 280 and/or other processors and modules at the UE 120*a* may perform or direct the execution of processes for the techniques described herein. For example, as shown in FIG. 2, the controller/processor 240 of the BS 110*a* has a RACH manager 241 that may be configured for a configurable RACH response message for a two-step RACH procedure, according to aspects described herein. As shown in FIG. 2, the controller/processor 280 of the UE 120*a* has a RACH manager 241 that may be configured for a configurable RACH response message for a two-step RACH procedure, according to aspects described herein. Although shown at the Controller/Processor, other components of the UE 120*a* and BS 110*a* may be used performing the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
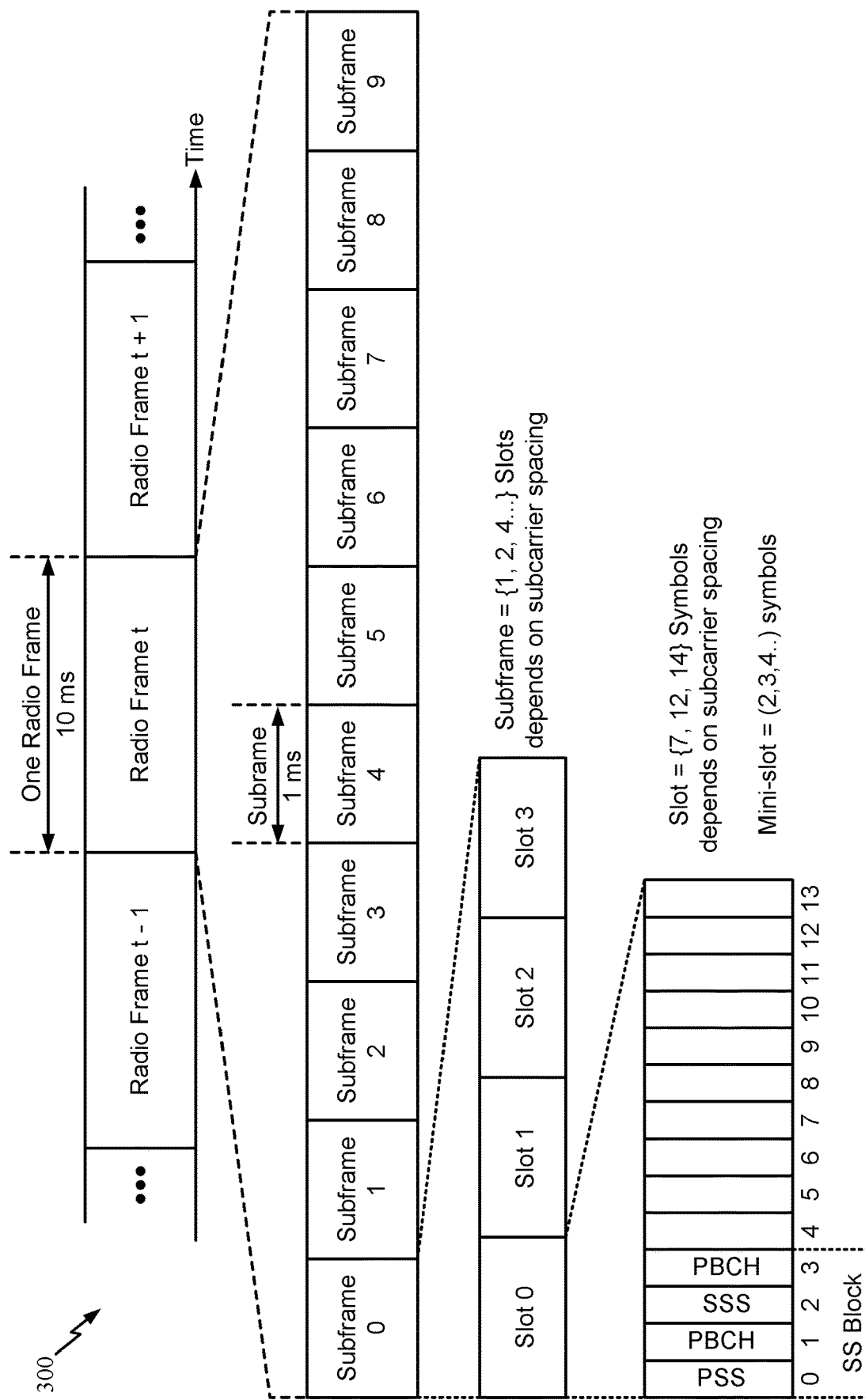
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

A random access channel (RACH) refers to a wireless channel (medium) that may be shared by multiple UEs, and may be used by the UEs to (randomly) access the network for communications. For example, the RACH may be used for call setup and to access the network for data transmissions. In some cases, RACH may be used for initial access to a network when the UE switches from a RRC connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 4:
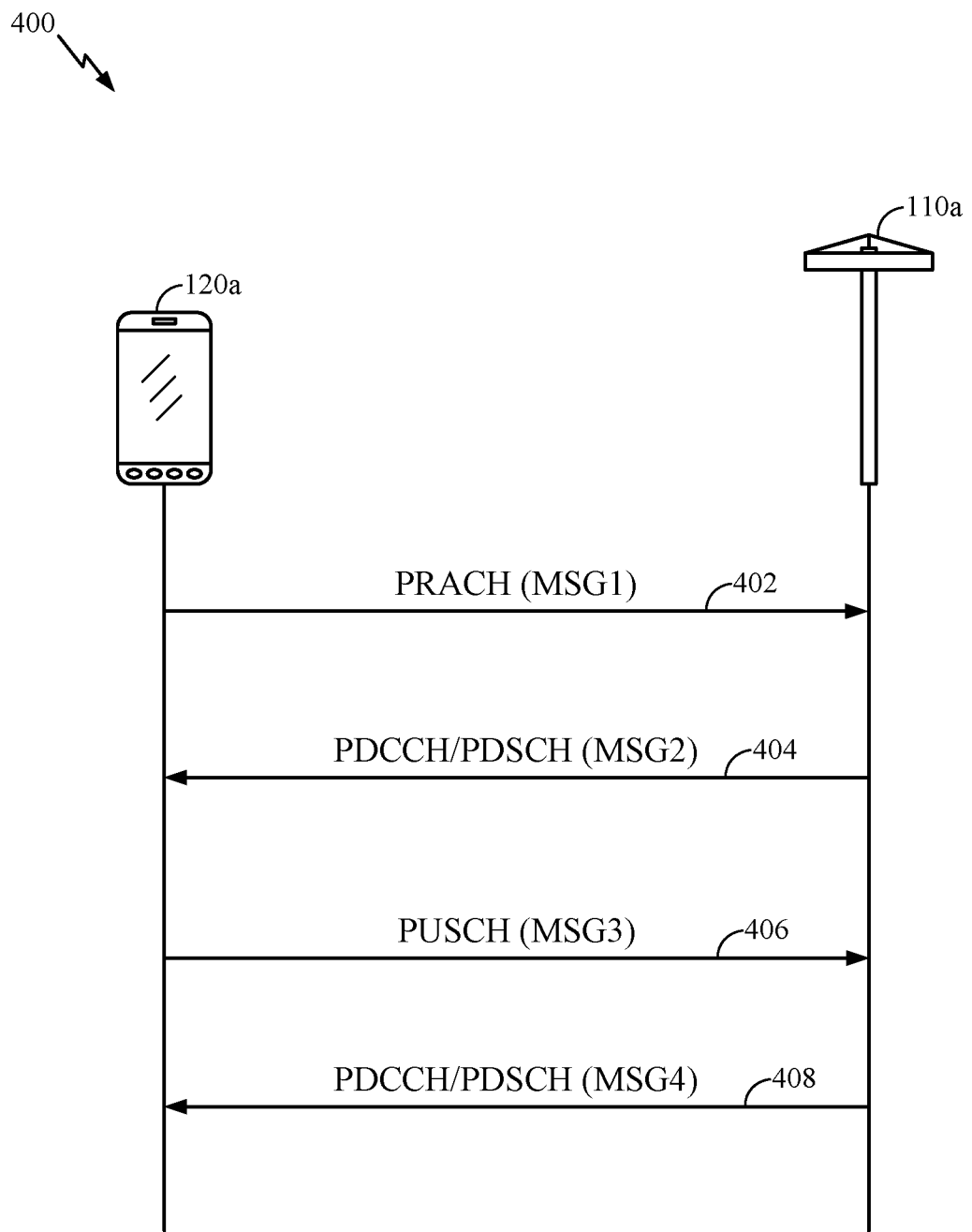
FIG. 4 is a timing diagram illustrating an example four-step random access channel (RACH) procedure, in accordance with certain aspects of the present disclosure.

FIG. 4 is a timing (or "call-flow") diagram 400 illustrating an example four-step RACH procedure. A first message (MSG1) may be sent from the UE 120*a* to BS 110*a* on the physical random access channel (PRACH), at 402. In the four-step RACH procedure, the MSG1 may only include a RACH preamble. BS 110*a* may respond with a random access response (RAR) message (MSG2) which may include the identifier (ID) of the RACH preamble, a timing advance (TA), an uplink grant, a cell radio network temporary identifier (C-RNTI), and/or a back off indicator, at 404. MSG2 may include a PDCCH communication including control information for a following communication on the PDSCH, as illustrated. In response to the MSG2, the UE 120*a* transmits MSG3 to the BS 110*a* on the PUSCH, at 406. The MSG3 may include one or more of a RRC connection request, a tracking area update (TAU) request, a system information request, a positioning fix or positioning signal request, or a scheduling request. The BS 110a then responds with the MSG 4 which may include a contention resolution message, at 408.

In some cases, to speed up access, a two-step RACH procedure may be supported. As the name implies, the two-step RACH procedure may effectively "collapse" the four messages of the four-step RACH procedure into two messages. There are several benefits to a two-step RACH procedure, such as speed of access and the ability to send a relatively small amount of data without the overhead of a full four-step RACH procedure to establish a connection (when the four-step RACH messages may be larger than the payload). The two-step RACH procedure can operate in any RRC state and any supported cell size. Networks that use two-step RACH procedures can typically support contention-based random access (CBRA) transmission of messages (e.g., MSG A) within a finite range of payload sizes and with a finite number of modulation coding scheme (MCS) levels.

Figure 5:
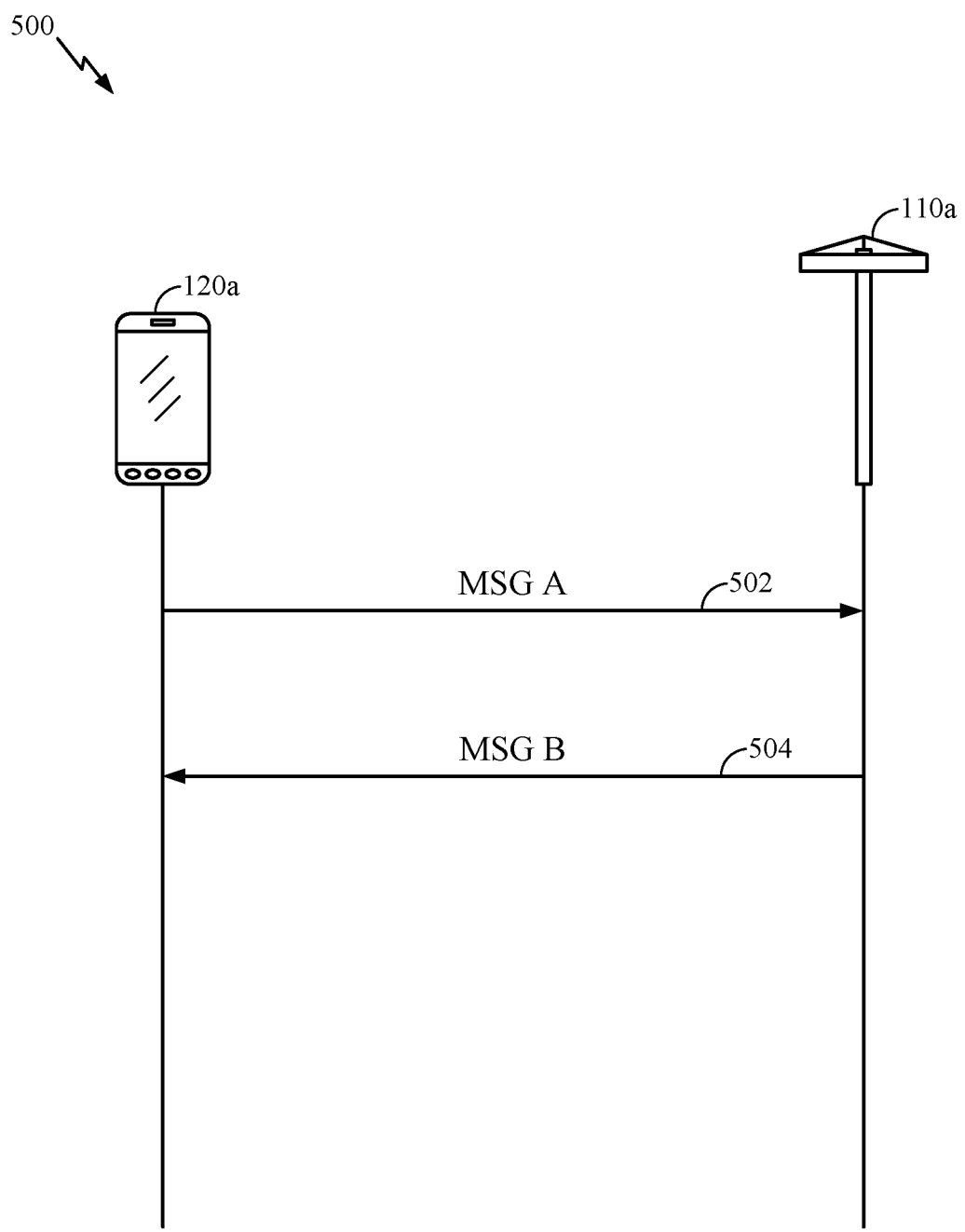
FIG. 5 is a timing diagram illustrating an example two-step RACH procedure, in accordance with certain aspects of the present disclosure.

FIG. 5 is a timing diagram 500 illustrating an example two-step RACH procedure, in accordance with certain aspects of the present disclosure. In the two-step RACH procedure, a first message (MSG A) may be sent from the UE 120a to BS 110a, at 502. The MSG A may include some or all the information from both the MSG1 and MSG3 from the four-step RACH procedure (effectively combining MSG1 and MSG3). For example, MSG A may include MSG1 and MSG3 multiplexed together such as using one of time-division multiplexing (TDM) or frequency-division multiplexing (FDM). The MSG A may include a RACH preamble for random access and a payload. The MSG A payload, for example, may include the UE-ID and other signaling information (e.g., buffer status report (BSR) or scheduling request (SR)). BS 110a may respond with a RAR message (MSG B) which may effectively combine the MSG2 and MSG4 of the four-step RACH procedure described above, at 504. For example, MSG B may include the ID of the RACH preamble (RAPID), a timing advance (TA), a back off indicator, a contention resolution message, UL/DL grant, and/or transmit power control (TPC) commands.

Figure 6:
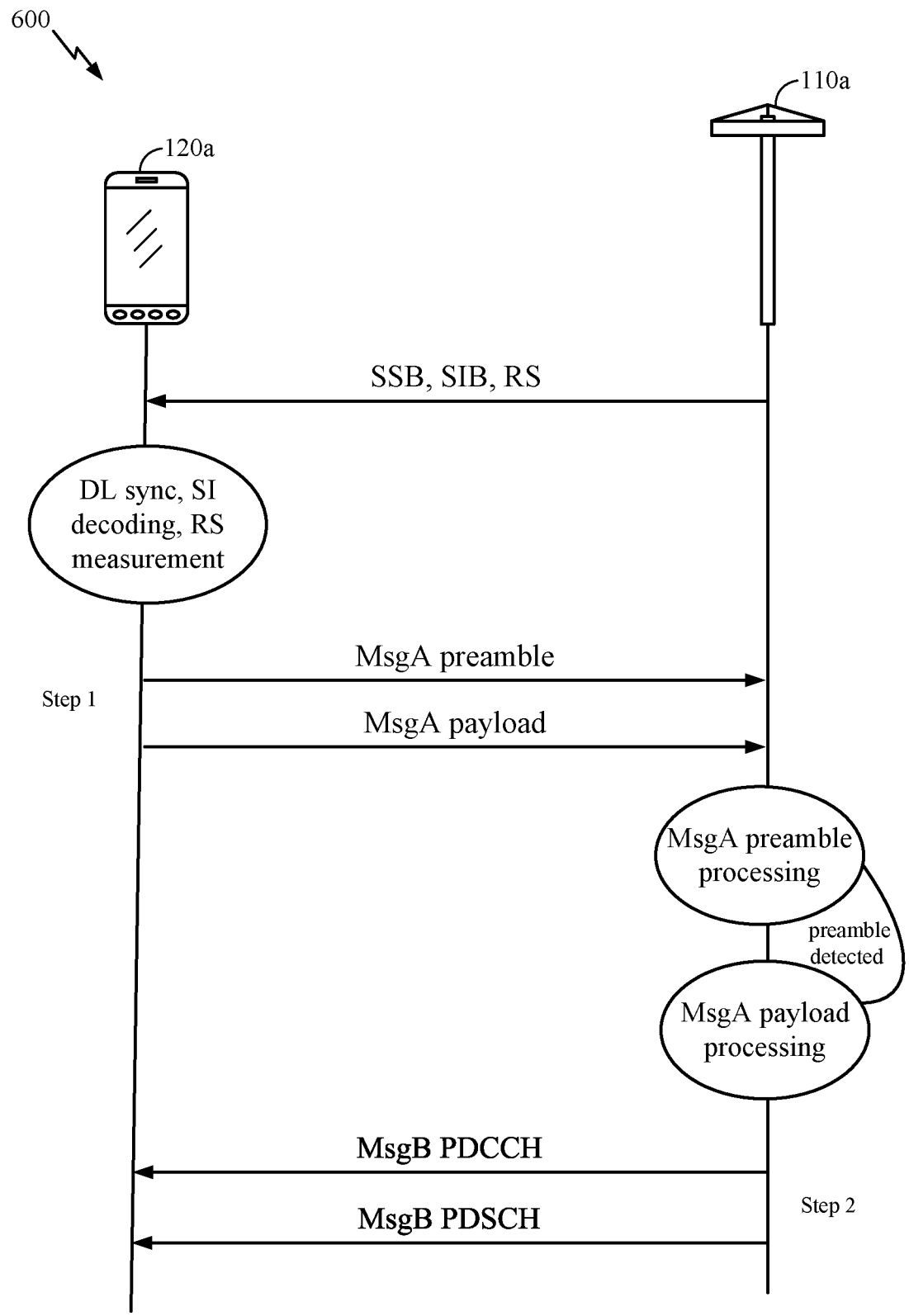
FIG. 6 is a timing diagram illustrating an example two-step RACH procedure, in accordance with certain aspects of the present disclosure.

FIG. 6 is a timing diagram illustrating a more detailed example of the two-step RACH procedure, in accordance with certain aspects of the present disclosure. As shown in FIG. 6, the UE 120a may receive and decode information from the BS, such as a SSB, system information block (SIB), and/or RS prior to the RACH procedure, which may be used by the UE 120a to perform the RACH procedure with the BS 110a. As shown in FIG. 6, in the two-step RACH procedure, the MSG A may include a both a preamble (e.g., PRACH) and a payload (e.g., DMRS and PUSCH). The BS attempts to decode the process/decode the SMG A preamble and payload and then sends the MSG B (e.g., based on the MSG A processing). As shown in FIG. 6, the MSG B may include both the PDCCH and PDSCH.

Figure 7A:
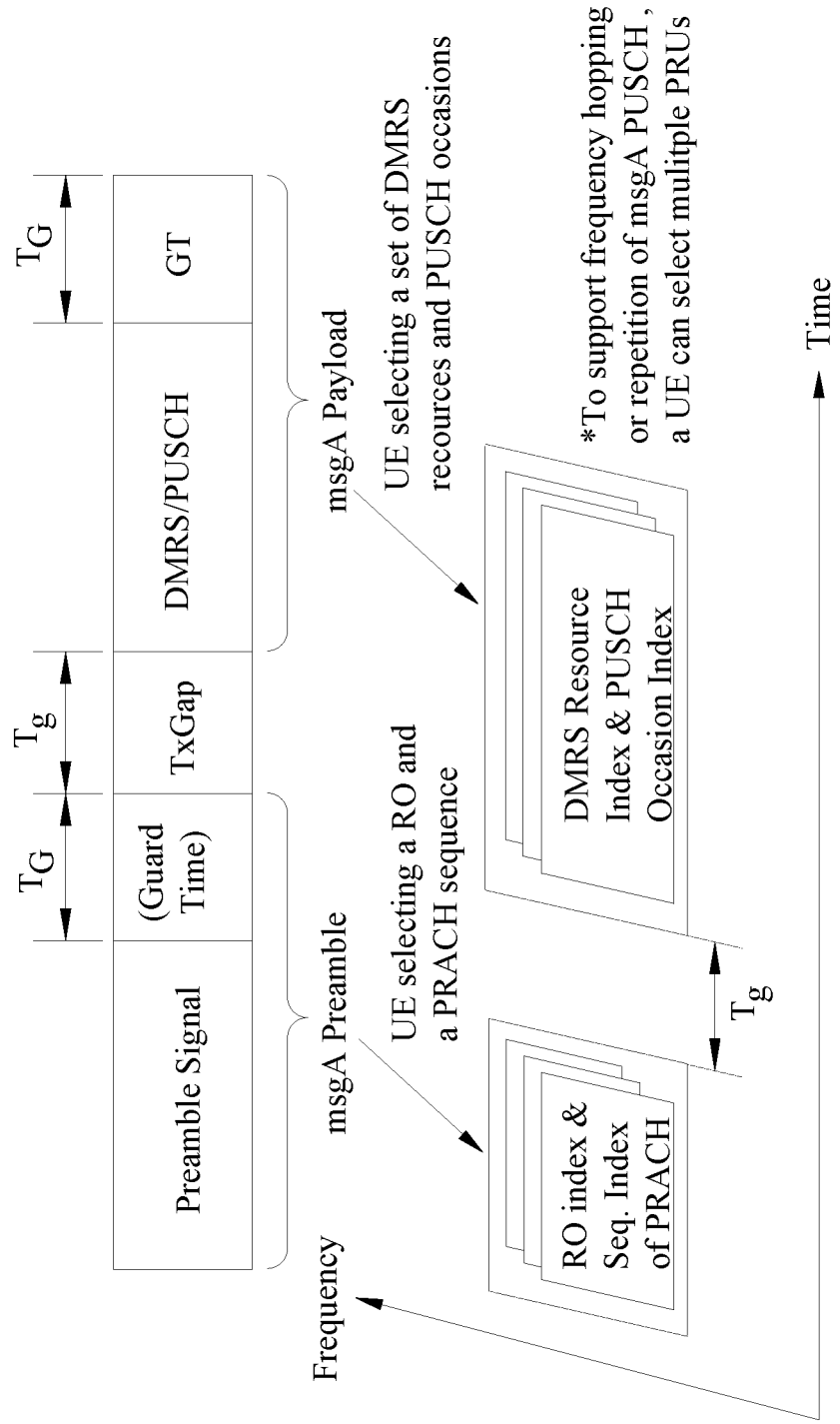
FIG. 7A illustrates a channel structure for MSG A, in accordance with certain aspects of the present disclosure.
Figure 7B:
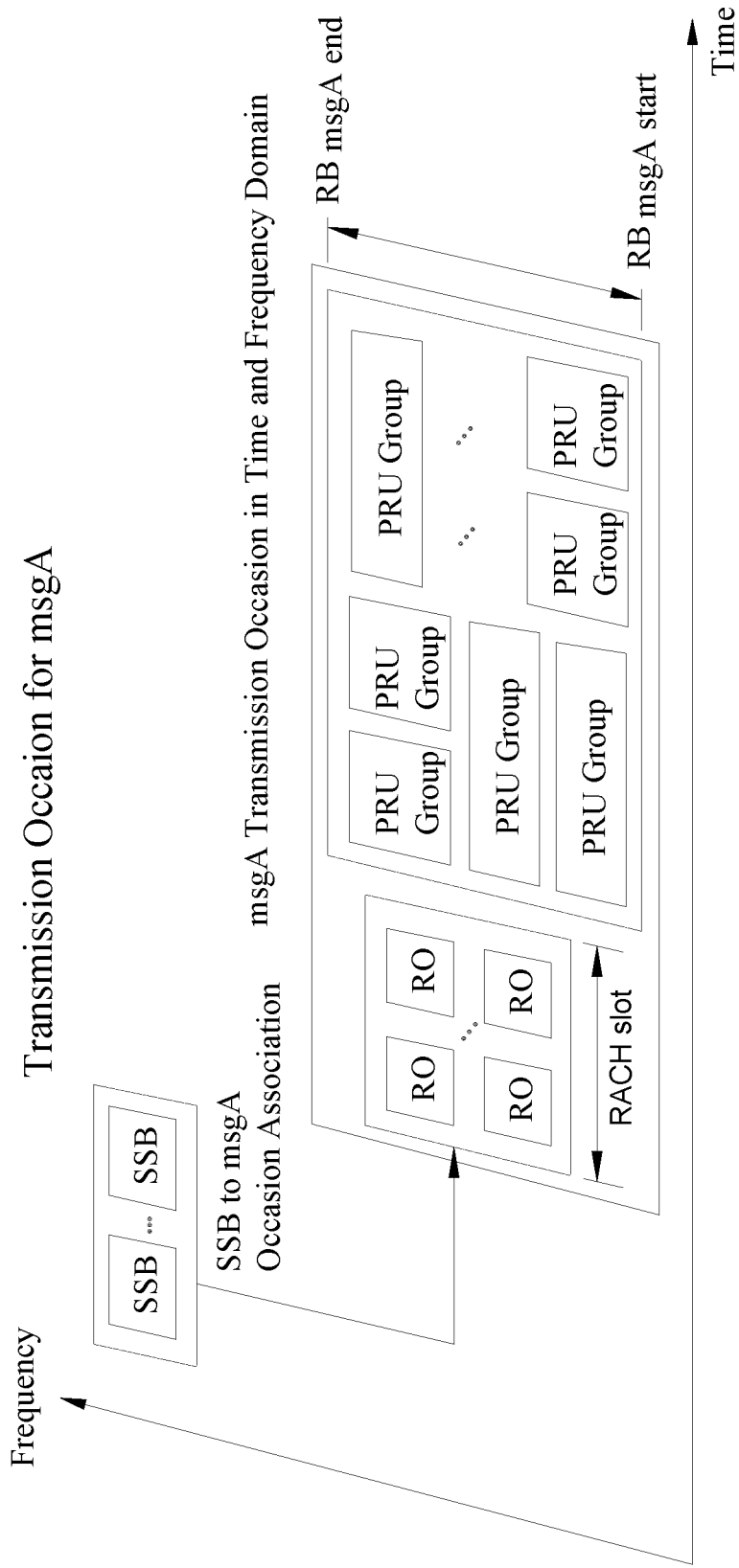
FIG. 7B illustrate a transmission occasion for MSG A, in accordance with certain aspects of the present disclosure.

FIG. 7A illustrates the channel structure for an example MSG A transmission occasion that may be validated, in accordance with certain aspects of the present disclosure. As shown in FIG. 7A, the MSG A transmission occasion generally includes a MSG A preamble occasion (for transmitting a preamble signal) and a MSG A payload occasion for transmitting a PUSCH. As illustrated in FIG. 7A, the MSG A preamble transmission may involve (1) selection of a preamble sequence; and (2) selection of a preamble occasion in time/frequency domain (for transmitting the selected preamble sequence). The MSG A payload transmission may involve: (1) construction of the random access message payload (DMRS/PUSCH); and (2) selection of one or multiple PUSCH resource units (PRUs) in time/frequency domain to transmit this message (payload). As illustrated in FIG. 7B, the UE monitors SSB transmissions which are sent (e.g., sent repeatedly by the BS using different TX beams) and are associated with a finite set of time/frequency resources defining RACH occasions (ROs) and PRUs. The RACH preamble occasion (RO) may be the time and frequency resource assigned for preamble transmission.

Upon detecting an SSB, the UE may select an RO and one or more PRUs associated with that SSB for a MSG A transmission. The finite set of ROs and PRUs may help reduce monitoring overhead (blind decodes) by a base station.

In certain systems (e.g., 5G NR), up to 64 preamble sequences are configured on each RO. Multiple four-step and/or multiple two-step RACH UEs can share the same RO, and randomly select their preamble sequences from a common pool. In some examples, the network configures separate ROs for the two-step and four-step RACH UEs, or the network configures separate pools but a shared RO for the two-step and four-step RACH UEs.

As mentioned above, the MSG B could be unicast or multicast. In some cases, unicast MSG B may be desirable/supportable, while in other cases multicasting the MSG B may be desirable/supportable. Unicasting the MSG B may allow the BS to send the UE a large payload, while multicasting the MSG B can reduce complexity for blind decoding and allow the RACH response message to carry multiple small payloads for multiple UEs.

Example Configurable Mode for Response to Random Access Message

Aspects of the present disclosure provide a configurable mode of a random access channel (RACH) response message (e.g., MSG B) transmission and construction. In some examples, the network can configure the mode (e.g., unicast or multicast) based on various parameters, such as system loading (e.g., how many user equipment (UEs) will perform the two-step RACH procedure at the same time), cell coverage, and resource availability (e.g., how much time/frequency resources and RACH sequences are available). For example, if the system loading is high and/or if a physical downlink control channel (PDCCH) payload will be large, then the unicast mode may be used, whereas if the system loading is low and/or the PDCCH payload is small then the multicast mode may be used.

The configured mode can be indicated to a UE. Indicating the mode may allow to determine a search space to monitor/decode the RACH response message. In addition, the UE can know the multiple access signature based on the indicated mode. In some examples, content of the RACE response message may depend on the radio resource control (RRC) state of the UE and/or based on processing of the RACH message (e.g., MSG A).

According to certain aspects, in the unicast mode for the RACH response message, the PDCCH of the RACH response message carries a downlink assignment for the physical downlink shared channel (PDSCH) of the RACH response message targeting a single two-step UE. The PDCCH of the RACH response message is transmitted in a UE-specific search space (USS). In some examples, the cyclic redundancy check (CRC) of PDCCH of the unicast RACH response message is masked by a UE-specific multiple access signature (e.g., denoted by msgB-RNTI_1). Thus, based on indicating the unicast mode, the UE knows to monitor/decode the PDCCH, whose CRC is masked by the multiple access signature, of the RACH response message in the USS.

According to certain aspects, the multiple access signature depends on the outcome of the RACH message (e.g., MSG A) processing and on the RRC state of the UE. For example, if the UE is in an RRC idle or RRC inactive state and the BS detects the RACH message, then the multiple access signature (e.g., msgB_RNTI_1) can be calculated, such as by a weighted combination of the resource index used for the RACH message transmission, including RO index, preamble index and UL carrier index. In an example, the multiple access signature can be calculated as follows:

$$\text{msg}B\_RNTI\_1=1+s\_id+14\times t\_id+14\times 80\times f\_id+14\times 80\times 8\times ul\_carrier\_id+14\times 80\times 8\times 2\times rf\_id+C\_1+C\_2*\text{PRACH\_preamble\_id},$$

where rf_id is modular operation of radio frame index (rf_id=(radio frame index) mod 2+1), PRACH_preamble_id is the index of preamble sequence on the selected RO (0≤PRACH_preamble_id<64), s_id is the index of the first OFDM symbol of the specified PRACH (0≤s_id<14), t_id is the index of the first slot symbol of the specified PRACH in a system frame (0≤t_id<80), f_id is the index of the specified PRACH in the frequency domain (0≤f_id<8), ul_carrier_id is the UL carrier used for RACH message (e.g., MSG A) transmission (0=normal carrier, 1=SUL carrier), C_1≥1 and C_2≥0 are constants. Otherwise, if the BS does not detect the RACH message, the BS does not need to transmit a RACH response message.

In another example, if the UE is in an RRC connected state and the BS detects the RACH message payload, then the multiple access signature (C-RNTI) of UE can be used (e.g., used as the msgB_RNTI_1). Otherwise, if only the BS only detects the RACH preamble, then same formula above for the RRC_IDLE or RRC_INACTIVE UE can be reused.

To mitigate potential collision between C-RNTI and other multiple access signature (e.g., msgB_RNTI_1) values, a 1-bit flag for C-RNTI can be carried by the downlink control information (DCI) of the PDCCH of the RACH response message. The 1-bit flag may indicate whether the multiple access signature is a C-RNTI or a msgB_RNTI_1.

According to certain aspects, in the unicast mode for the RACH response message, the PDSCH of the RACH response message carries the response information for a single UE. According to certain aspects, contents of the unicast RACH response message depends on the outcome of the RACH message (e.g., MSG A) processing and on the RRC state of the UE. FIG. 8 is a table 800 showing example contents of the unicast RACH response message PDCCH and PDSCH depending on the RRC state and whether the BS successfully decoded the RACH payload and preamble from the UE.

According to certain aspects, in the multicast mode for the RACH response message, the PDCCH of the RACH response message is transmitted in a common search space (CSS). The PDCCH of the RACH response message carries the DL assignment of a MSG B PDSCH targeting a group of two-step RACH UEs. In some examples, the CRC of the PDCCH of the RACH response message is masked by a group-specific multiple access signature (e.g., denoted by msgB-RNTI). The PDCCH of the RACH response message may be differentiated from msg2 PDCCH, if two-step RACH and four-step RACH are sharing the same ROs. For example, the PDCCH of the RACH response message for the two-step and four-step RACH can be differentiated based on different control resource set (CORESET), different search space configurations for msgB PDCCH and msg2 PDCCH, different quasi co-location (QCL) relations, different demodulation reference signal (DMRS) resource configuration, and/or different values for the multiple access signature (e.g., different msgB-RNTI_2 and random access radio network temporary identifier (RA-RNTI)).

According to certain aspects, for the multicast RACH response message, the PDSCH of the RACH response message carries an aggregation of the response information for each UE in the group. According to certain aspects, contents of the multicast RACH response message depends on the outcome of the RACH message (e.g., MSG A) processing and on the RRC state of the UE. FIG. 9 is a table 900 showing example contents of the multicast RACH response message PDCCH and PDSCH depending on the RRC state and whether the BS successfully decoded the RACH payload and preamble from the UE.

Figure 10:
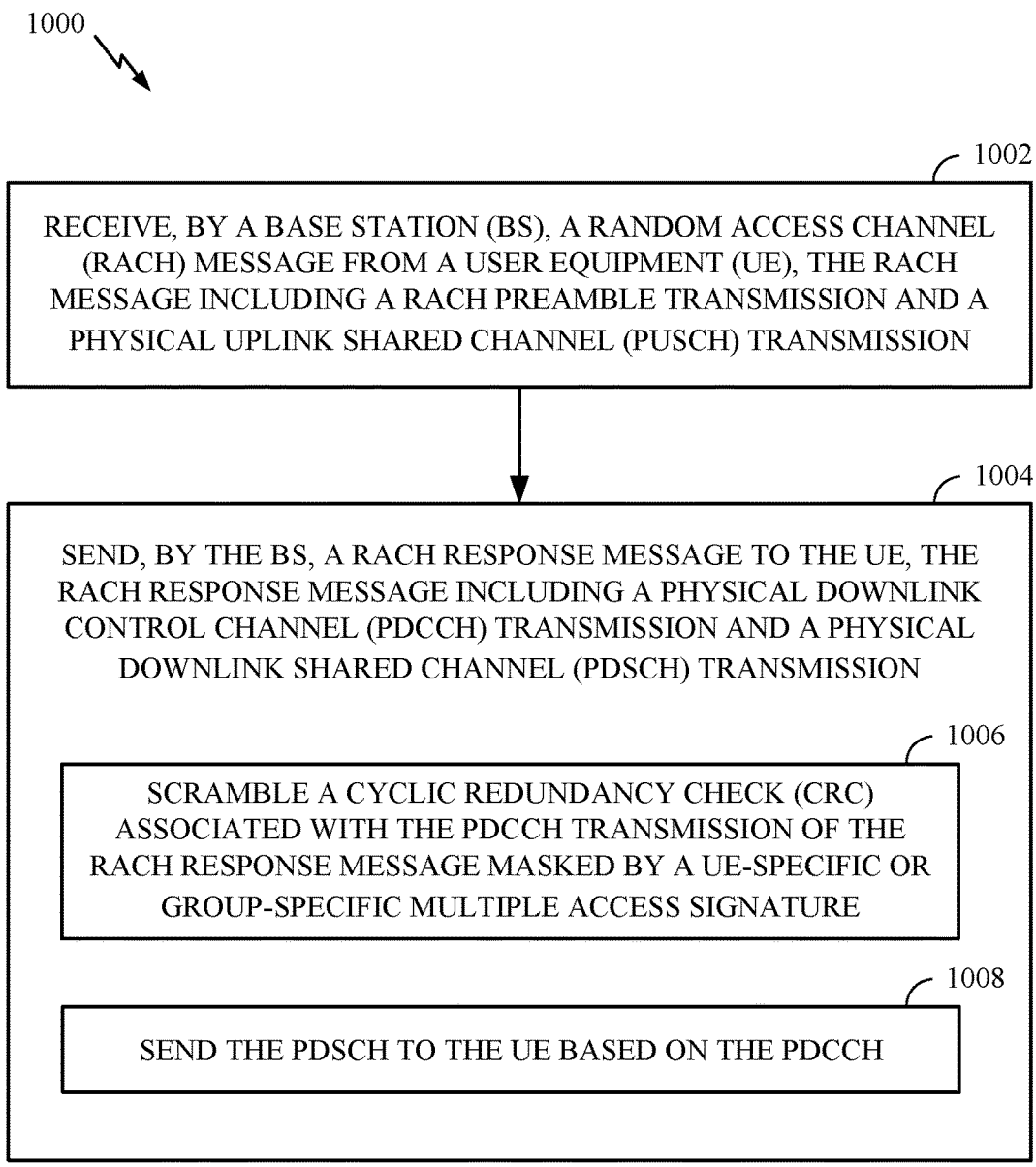
FIG. 10 is a flow diagram illustrating example operations for wireless communication by a BS, in accordance with certain aspects of the present disclosure.
Figure 11:
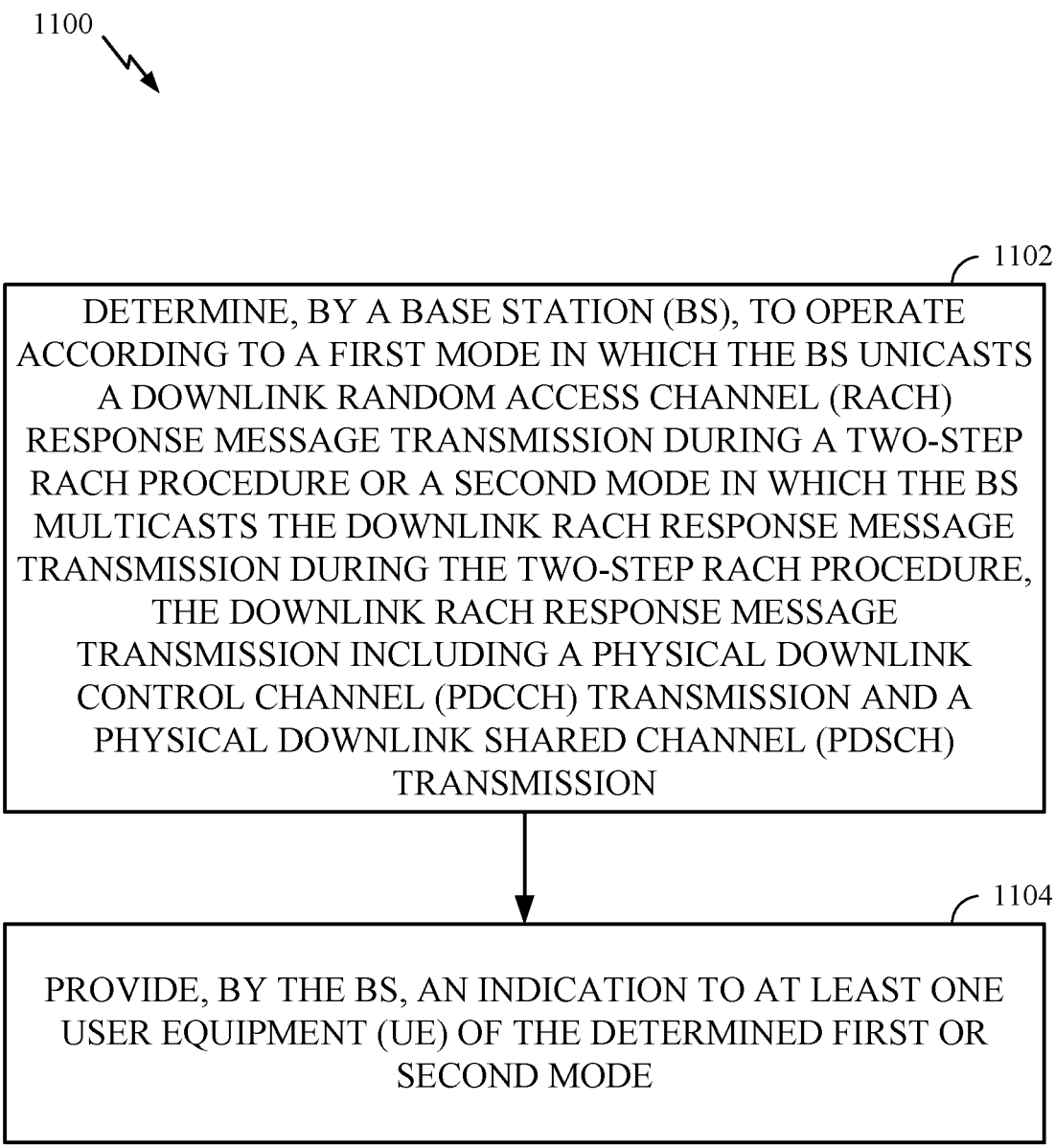
FIG. 11 is a flow diagram illustrating example operations for wireless communication by a BS, in accordance with certain aspects of the present disclosure.

FIGS. 10 and 11 are flow diagrams illustrating example operations 1000 and 1100, respectively, for wireless communication, in accordance with certain aspects of the present disclosure. The operations 1000 and 1100 may be performed, for example, by a BS (e.g., such as the BS 110a in the wireless communication network 100). Operations 1000 and 1100 may be implemented as software components that are executed and run on one or more processors (e.g., controller/processor 240 of FIG. 2). Further, the transmission and reception of signals by the BS in operations 1000 and 1100 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 1000 may begin, at 1002, by receiving a RACH message from a UE. The RACH message includes a RACH preamble transmission and a PUSCH transmission.

At 1004, the BS sends a RACH response message to the UE. The RACH response message includes a PDCCH transmission and a PDSCH transmission. Sending the RACH message to the UE includes, at 1006, scrambling a CRC associated with the PDCCH transmission of the RACH response message masked by a UE-specific or group-specific multiple access signature and, at 1008, sending the PDSCH to the UE based on the PDCCH.

The operations 1100 may begin, at 1102, by determining to operate according to a first mode in which the BS unicasts a downlink RACH response message (e.g., MSG B) transmission during a two-step RACH procedure or a second mode in which the BS multicasts the downlink RACH response message transmission during the two-step RACH procedure. The downlink RACH response message including a PDCCH transmission and a PDSCH transmission.

At 1204, the BS provides an indication to at least one UE of the determined first mode or second mode.

In a first aspect, the determination is based on at least one of: system loading, cell coverage, or resource availability.

In a second aspect, alone or in combination with the first aspect, the indication is broadcast in system information or transmitted via RRC signaling to the at least one UE before the two-step RACH procedure is performed.

In a third aspect, alone or in combination with one or more of the first aspect and second aspects, the BS further performs the two-step RACH procedure with the at least one UE in accordance with the indicated first mode or second mode.

In a fourth aspect, alone or in combination with one or more of the first through third aspects, performing the RACH procedure with the at least one UE includes determining whether the BS successfully decoded a RACH preamble and a RACH payload in an uplink RACH message from the UE; and determining a RRC state of the UE.

In a fifth aspect, alone or in combination with one or more of the first through fourth aspects, determining whether the BS received the RACH preamble from the UE comprises determining whether the BS successfully decoded the RACH preamble during an assigned RACH preamble occasion (RO); determining whether the BS received the RACH payload comprises determining whether the BS successfully decoded the RACH payload during an assigned RACH payload occasion; and determining the RRC state of the UE is based at least on an indication from the UE in the uplink RACH message.

In a sixth aspect, alone or in combination with one or more of the first through fifth aspects, content of the downlink RACH response message is based on determined first mode or second mode, the RRC state of the UE, and whether the BS successfully decoded the RACH preamble and RACH payload from the UE.

In a seventh aspect, alone or in combination with one or more of the first through sixth aspects, performing the RACH procedure with the at least one UE comprises: DTX (discontinuous transmission) or sending the downlink RACH response message with a BI when the BS did not successfully decode the RACH preamble.

In an eighth aspect, alone or in combination with one or more of the first through seventh aspects, the PDSCH transmission of the RACH response message transmission carries at least a TAC and a fallback RAR when the BS successfully decoded the RACH preamble without successfully decoding the RACH payload.

In a ninth aspect, alone or in combination with one or more of the first through eighth aspects, the PDCCH transmission of the RACH response message transmission carries at least a downlink assignment for the PDSCH transmission of the RACH response message transmission when the BS successfully decoded the RACH preamble without successfully decoding the RACH payload.

In a tenth aspect, alone or in combination with one or more of the first through ninth aspects, the PDCCH transmission of the RACH response message transmission further carries a PUCCH resource configuration for HARQ procedures of the PDSCH transmission of the RACH response message transmission.

In an eleventh aspect, alone or in combination with one or more of the first through tenth aspects, the PDSCH transmission of the RACH response message transmission carries at least a TAC when the BS successfully decoded the RACH payload and the UE is in an RRC connected state.

In a twelfth aspect, alone or in combination with one or more of the first through eleventh aspects, the PDSCH transmission of the RACH response message transmission further carries at least one of: an RRC message or an uplink grant for new data.

In a thirteenth aspect, alone or in combination with one or more of the first through twelfth aspects, the PDSCH transmission of the RACH response message transmission carries at least a successful RAR and a TAC when the BS successfully decoded the RACH payload and the UE is in an RRC inactive or RRC idle state.

In a fourteenth aspect, alone or in combination with one or more of the first through thirteenth aspects, the PDSCH transmission of the RACH response message transmission further carries at least one of: an RRC message, an uplink grant for new data, or a PUCCH resource configuration for a HARQ procedure of the PDSCH transmission of the RACH response message transmission.

In a fifteenth aspect, alone or in combination with one or more of the first through fourteenth aspects, performing the RACH procedure with the at least one UE comprises unicasting the PDCCH transmission of RACH response message transmission, in a USS configured for PDCCH, carrying a downlink assignment for the PDSCH transmission of the RACH response message transmission when the BS operates according to the first mode, wherein the PDSCH transmission carries the response information for a single UE.

In a sixteenth aspect, alone or in combination with one or more of the first through fifteenth aspects, a CRC associated with the PDCCH transmission of the RACH response message transmission is masked by a UE-specific multiple access signature; the signature is calculated based on resources used for the at least one of: the RACH preamble or RACH payload when the BS successfully decoded the RACH payload and the UE is in the RRC inactive or RRC idle state; and the multiple access signature is a unique identifier (e.g. C-RNTI) assigned for the UE in RRC connected state when the BS successfully decoded the RACH payload; and the multiple access signature for RRC connected UE can use the same formula as RRC inactive or RRC idle UE when the BS decoded the RACH preamble without successfully decoding the RACH payload.

In a seventeenth aspect, alone or in combination with one or more of the first through sixteenth aspects, a flag in DCI of the PDCCH transmission of the RACH response message transmission indicates whether the signature is calculated for UE in RRC inactive or idle state, or is the unique identifier assigned for the UE in RRC connected state.

In an eighteenth aspect, alone or in combination with one or more of the first through seventeenth aspects, the PDCCH transmission of the RACH response message transmission further indicates a configuration for the PUCCH resources for HARQ feedback to the PDSCH transmission of the RACH response message transmission.

In a nineteenth aspect, alone or in combination with one or more of the first through eighteenth aspects, performing the RACH procedure with the at least one UE comprises transmitting a PDCCH transmission of the RACH response message transmission, in a CSS configured for group common PDCCH, carrying a downlink assignment for the PDSCH transmission of the RACH response message transmission when the BS operates according to the second mode.

In a twentieth aspect, alone or in combination with one or more of the first through nineteenth aspects, a CRC associated with the PDCCH is masked by a group-specific multiple access signature that is different than a signature associated with PDCCH used for the first mode.

In a twenty-first aspect, alone or in combination with one or more of the first through twentieth aspects, the PDCCH transmission of the RACH response message transmission for a two-step RACH procedure uses at least one of: a different CORESET, a different search space configuration, a different QCL relation, a different DMRS resource configuration, or a different multiple access signature than a PDCCH transmission of the RACH response message (message 2) transmission by the BS for a four-step RACH procedure.

In a twenty-second aspect, alone or in combination with one or more of the first through twenty-first aspects, the PDCCH transmission of the RACH response message transmission further carries an indication of PUCCH resources for HARQ feedback to the PDSCH transmission of the RACH response message transmission when the BS successfully decoded the RACH payload and the UE is in the RRC connected state.

In a twenty-third aspect, alone or in combination with one or more of the first through twenty-second aspects, the PDSCH transmission of the RACH response message transmission further carries an indication of physical uplink control channel (PUCCH) resources for HARQ feedback when the BS successfully decoded the RACH payload and the UE is in the RRC inactive or RRC idle state.

Figure 12:
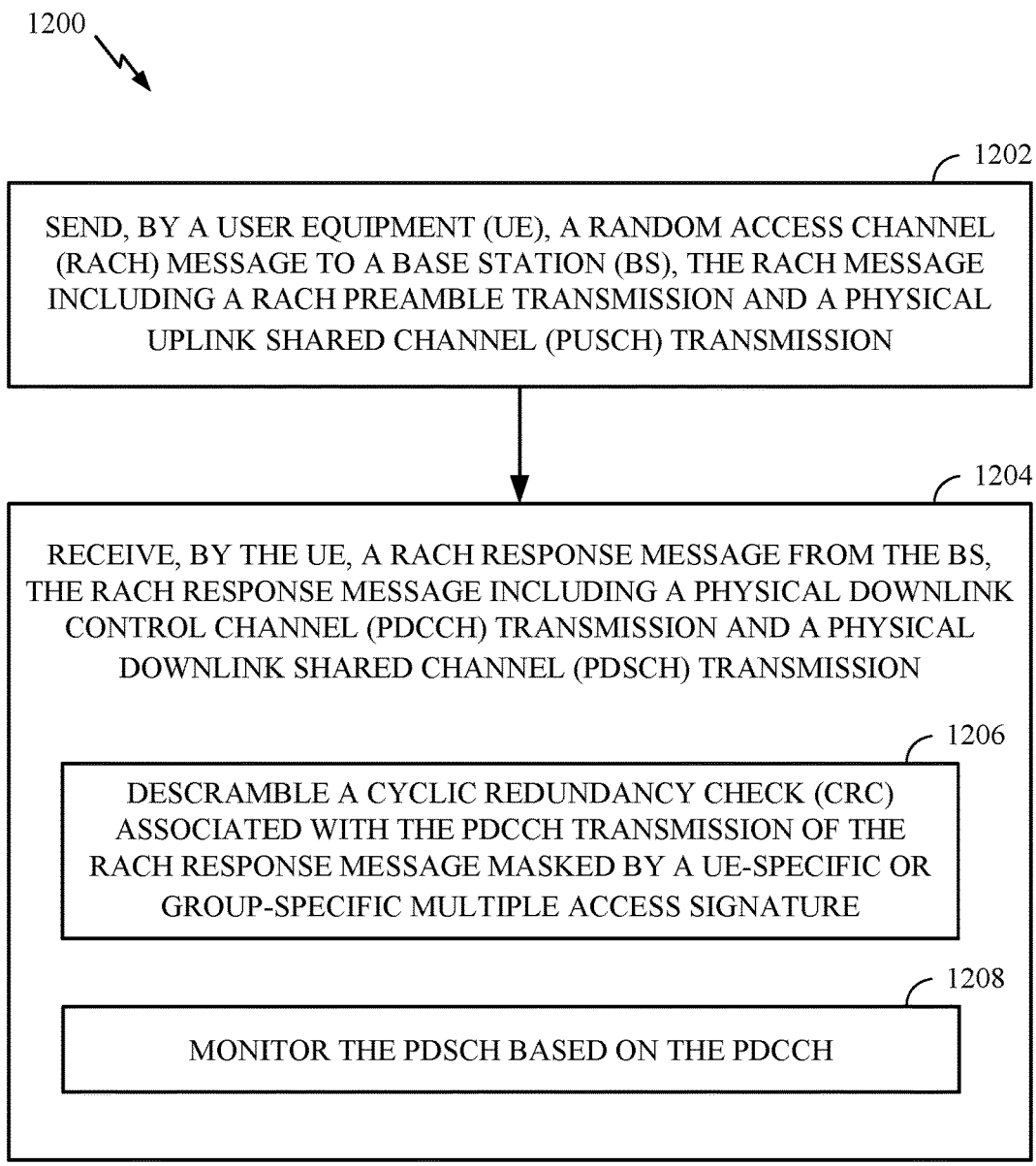
FIG. 12 is a flow diagram illustrating example operations for wireless communication by a UE, in accordance with certain aspects of the present disclosure.
Figure 13:
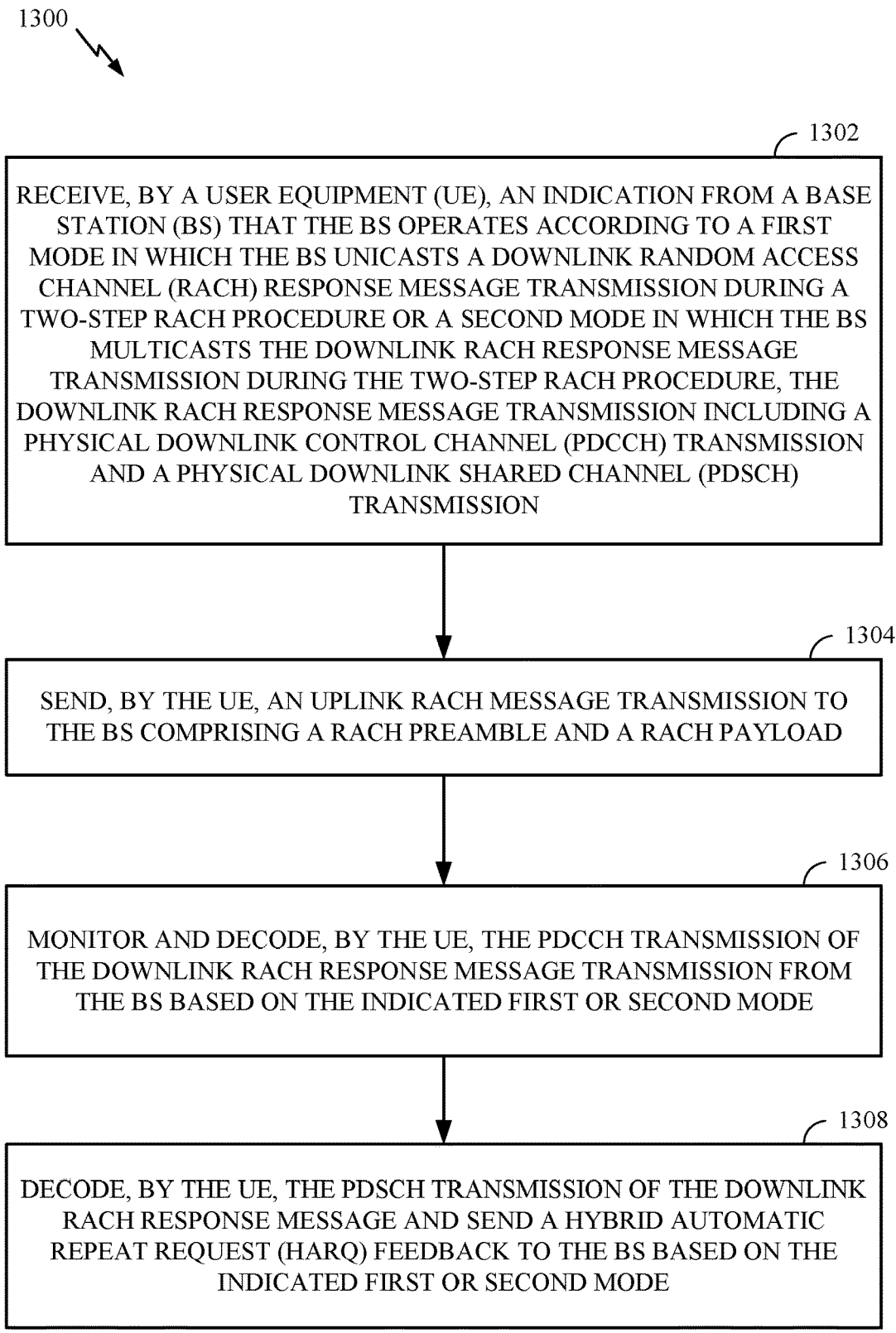
FIG. 13 is another flow diagram illustrating example operations for wireless communication by a UE, in accordance with certain aspects of the present disclosure.

FIGS. 12 and 13 are flow diagrams illustrating example operations 1200 and 1300, respectively, for wireless communication, in accordance with certain aspects of the present disclosure. The operations 1200 and 1300 may be performed, for example, by a UE (e.g., such as a UE 120a in the wireless communication network 100). The operations 1200 and 1300 may be complimentary operations by the UE to the operations 1000 and 1100, respectively, performed by the BS. Operations 1200 and 1300 may be implemented as software components that are executed and run on one or more processors (e.g., controller/processor 280 of FIG. 2). Further, the transmission and reception of signals by the UE in operations 1200 and 1300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1200 may begin, at 1202, by sending a RACH message to a BS. The RACH message includes a RACH preamble transmission and a PUSCH transmission.

At 1204, the UE receives a RACH response message from the BS. The RACH message from the BS includes a PDCCH transmission and a PDSCH transmission.

Receiving the RACH response message from the BS includes, at 1206, descrambling a CRC associated with the PDCCH transmission of the RACH response message masked by a UE-specific or group-specific multiple access signature and, at 1208, monitoring the PDSCH based on the PDCCH.

Operations 1300 may begin, at 1302, by receiving an indication from a BS that the BS operates according to a first mode in which the BS unicasts a downlink RACH response message during a two-step RACH procedure or a second mode in which the BS multicasts the downlink RACH response message during the two-step RACH procedure, the downlink RACH response message transmission including a PDCCH transmission and a PDSCH transmission.

At 1304, the UE sends an uplink RACH message transmission to the BS comprising a RACH preamble and a RACH payload.

At 1306, the UE monitors and decodes the PDCCH transmission of the downlink RACH response message from the BS based on the indicated first mode or second mode.

At 1308, the UE decodes the PDSCH transmission of the downlink RACH response message transmission and sends a HARQ feedback to the BS based on the indicated first mode or second mode.

In a first aspect, the indication is broadcast in system information or transmitted via RRC signaling from the BS before the two-step RACH procedure is performed.

In a second aspect, alone or in combination with the first aspect, the RACH preamble is transmitted during an assigned RO; and the RACH payload is transmitted during an assigned RACH payload occasion.

In a third aspect, alone or in combination with one or more of the first aspect and second aspects, the UE further provides an indication of a RRC state of the UE in the uplink RACH message transmission.

In a fourth aspect, alone or in combination with one or more of the first through third aspects, the PDSCH transmission of the RACH response message transmission carries at least a TAC and a fallback RAR.

In a fifth aspect, alone or in combination with one or more of the first through fourth aspects, the PDCCH transmission of the RACH response message transmission carries at least a downlink assignment for the PDSCH transmission of the RACH response message transmission.

In a sixth aspect, alone or in combination with one or more of the first through fifth aspects, the PDCCH transmission of the RACH response message transmission further carries a PUCCH resource configuration for HARQ procedures of the PDSCH transmission of the RACH response message transmission.

In a seventh aspect, alone or in combination with one or more of the first through sixth aspects, the PDSCH transmission of the RACH response message transmission carries at least a TAC when the UE is in an RRC connected state.

In an eighth aspect, alone or in combination with one or more of the first through seventh aspects, the PDSCH transmission of the RACH response message transmission further carries at least one of: an RRC message or an uplink grant for new data.

In a ninth aspect, alone or in combination with one or more of the first through eighth aspects, the PDSCH transmission of the RACH response message transmission carries at least a successful RAR and a TAC when the UE is in an RRC inactive or RRC idle state.

In a tenth aspect, alone or in combination with one or more of the first through ninth aspects, the PDSCH transmission of the RACH response message transmission further carries at least one of: an RRC message, an uplink grant for new data, or a PUCCH resource configuration for a HARQ procedures of the PDSCH transmission of the RACH response message transmission.

In an eleventh aspect, alone or in combination with one or more of the first through tenth aspects, monitoring the PDCCH transmission of the downlink RACH response message transmission comprises monitoring a unicast PDCCH transmission of the RACH response message transmission, in a USS configured for PDCCH, carrying a downlink assignment for the PDSCH transmission of the RACH response message transmission when the BS operates according to the first mode, wherein the PDSCH transmission carries the response information for a single UE.

In a twelfth aspect, alone or in combination with one or more of the first through eleventh aspects, the UE descrambles a CRC associated with the PDCCH transmission of the RACH response message transmission masked by a UE-specific multiple access signature, wherein the signature is calculated based on resources used for the at least one of: the RACH preamble or RACH payload; or the multiple access signature is a unique identifier (e.g. C-RNTI) assigned for the UE in RRC connected state.

In a thirteenth aspect, alone or in combination with one or more of the first through twelfth aspects, a flag in downlink control information of the PDCCH transmission of the RACH response message transmission indicates whether the signature is calculated for UE in RRC inactive or idle state, or is the unique identifier assigned for the UE in RRC connected state.

In a fourteenth aspect, alone or in combination with one or more of the first through thirteenth aspects, the PDCCH transmission of the RACH response message transmission further indicates a configuration for the PUCCH resources for HARQ feedback to the PDSCH transmission of the RACH response message transmission.

In a fifteenth aspect, alone or in combination with one or more of the first through fourteenth aspects, monitoring the PDCCH transmission of the downlink RACH response message transmission comprises transmitting a PDCCH transmission of the RACH response message transmission, in a CSS configured for group common PDCCH, carrying a downlink assignment for the PDSCH transmission of the RACH response message transmission when the BS operates according to the second mode.

In a sixteenth aspect, alone or in combination with one or more of the first through fifteenth aspects, the UE descrambles a CRC associated with the PDCCH masked by a group-specific multiple access signature that is different than a signature associated with PDCCH used for the first mode.

In a seventeenth aspect, alone or in combination with one or more of the first through sixteenth aspects, the UE monitors the PDCCH transmission of the RACH response message transmission for a two-step RACH procedure based on at least one of: a different CORESET, a different search space configuration, a different QCL relation, a different DMRS resource configuration, or a different multiple access signature than a PDCCH transmission of the RACH response message (message 2) transmission by the BS for a four-step RACH procedure.

In an eighteenth aspect, alone or in combination with one or more of the first through seventeenth aspects, the PDCCH transmission of the RACH response message transmission further carries an indication of PUCCH resources for HARQ feedback to the PDSCH transmission of the RACH response message transmission when the UE is in the RRC connected state.

In a nineteenth aspect, alone or in combination with one or more of the first through eighteenth aspects, the PDSCH transmission of the RACH response message transmission further carries an indication of PUCCH resources for HARQ feedback when the UE is in the RRC inactive or RRC idle state.

Figure 14:
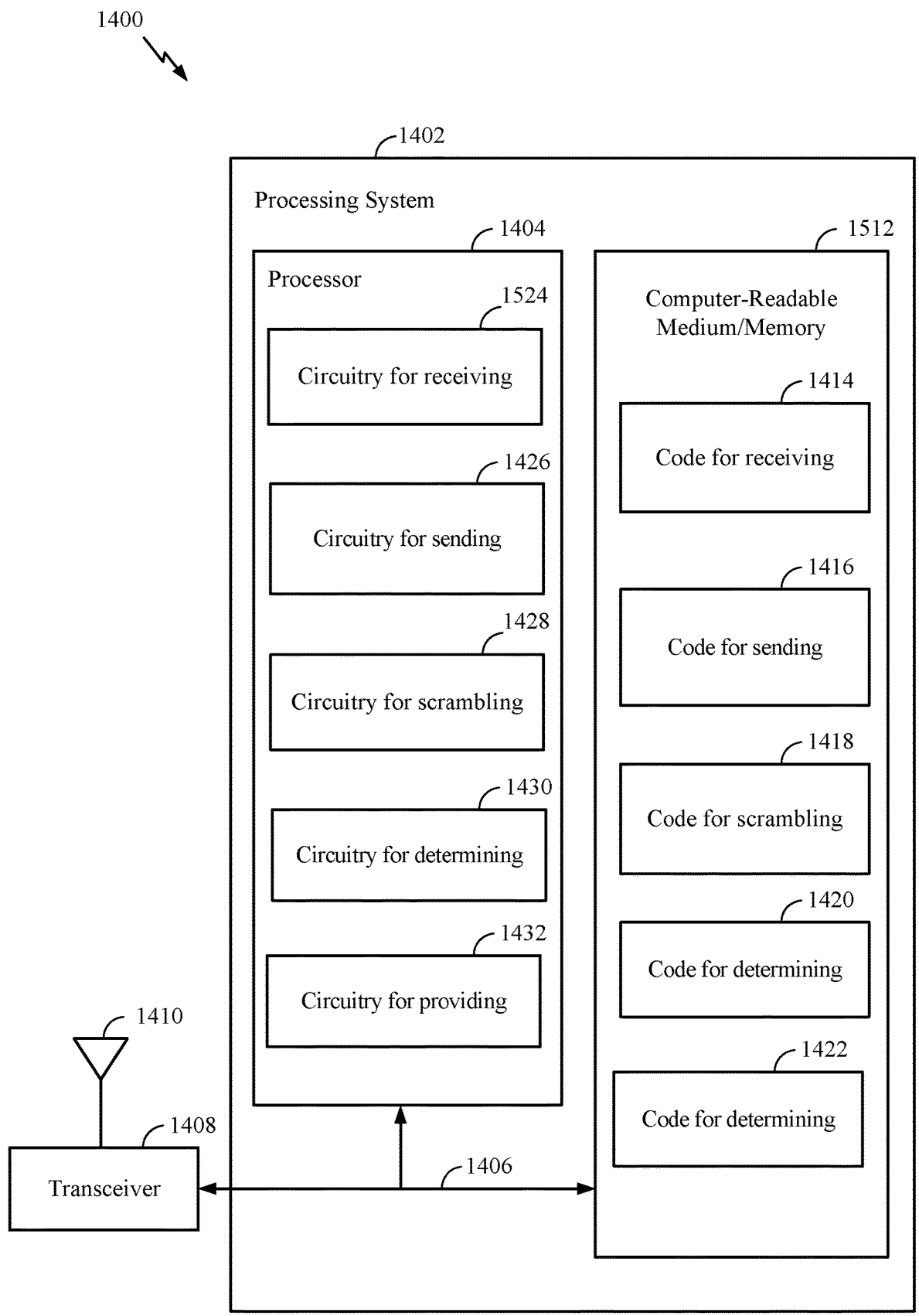
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 10 and/or FIG. 11. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 10 and/or FIG. 11, or other operations for performing the various techniques discussed herein for a configurable mode for a response to random access message. In certain aspects, computer-readable medium/memory 1412 stores code 1414 for receiving; code 1416 for sending; code 1418 for scrambling; code 1420 for determining; and/or code 1422 for providing, in accordance with aspects of the present disclosure. In certain aspects, the processor 1404 has circuitry configured to implement the code stored in the computer-readable medium/memory 1412. The processor 1404 includes circuitry 1424 for receiving; circuitry 1426 for sending; circuitry 1428 for scrambling; circuitry 1430 for determining; and/or circuitry 1432 for providing, in accordance with aspects of the present disclosure.

Figure 15:
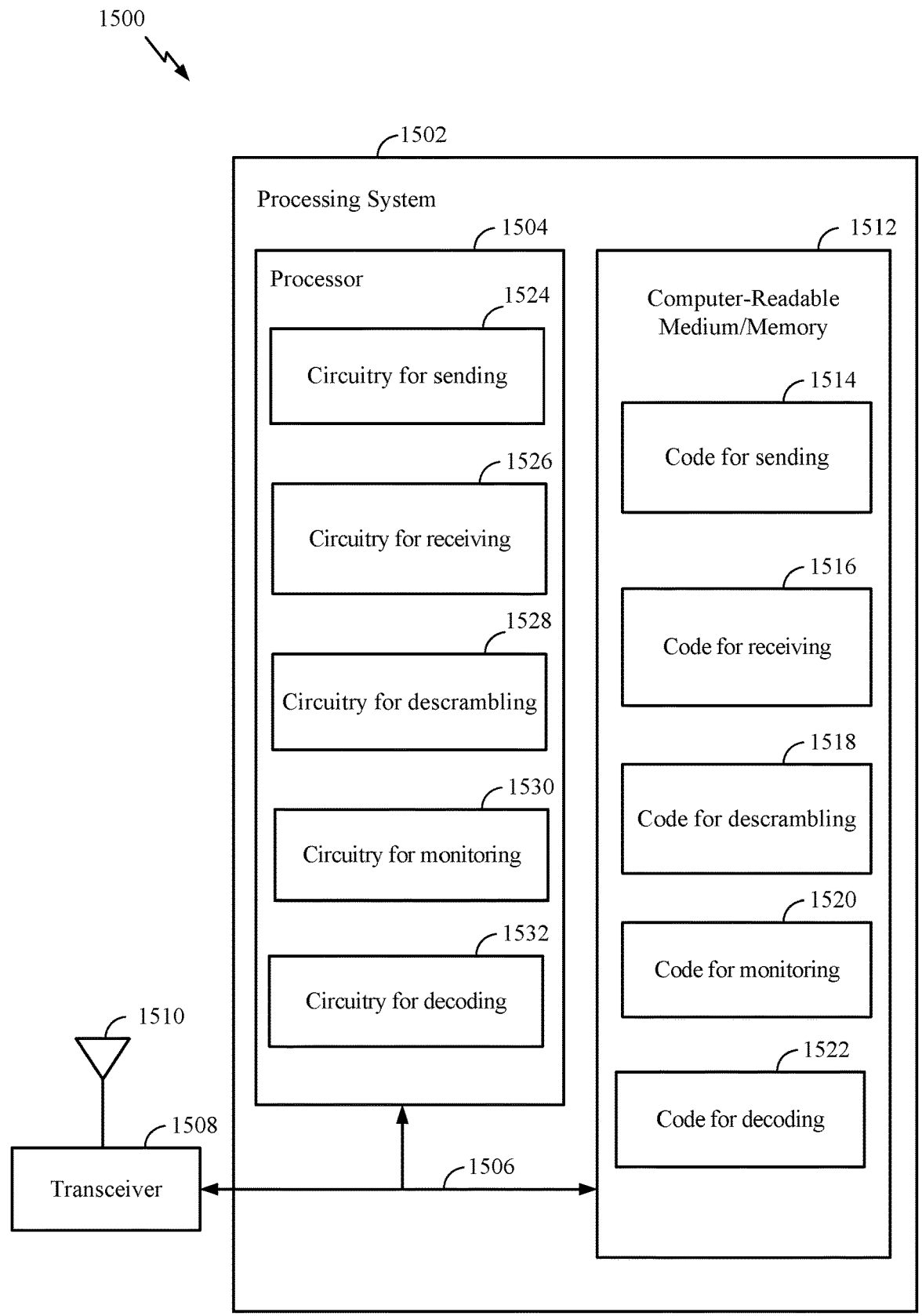
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 12 and/or FIG. 13. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 12 and/or FIG. 13, or other operations for performing the various techniques discussed herein for a configurable mode for a response to random access message. In certain aspects, computer-readable medium/memory 1512 stores code 1514 for receiving; code 1516 for sending; code 1518 for descrambling; code 1520 for monitoring; and/or code 1522 for decoding, in accordance with aspects of the present disclosure. In certain aspects, the processor 1504 has circuitry configured to implement the code stored in the computer-readable medium/memory 1512. The processor 1504 includes circuitry 1524 for receiving; circuitry 1526 for sending; circuitry 1528 for descrambling; code 1530 for monitoring; and/or code 1532 for decoding, in accordance with aspects of the present disclosure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 10-13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), the method comprising:
sending a random access channel (RACH) message including a RACH preamble transmission and a physical uplink shared channel (PUSCH) transmission; and
receiving a RACH response message including a physical downlink control channel (PDCCH) transmission and a physical downlink shared channel (PDSCH) transmission, wherein receiving the RACH response message includes:
when the RACH response message is for a first mode:
monitoring in a UE specific search space (USS) for the PDCCH transmission with a cyclic redundancy check (CRC) scrambled by a UE-specific cell radio network temporary identifier (C-RNTI); and
monitoring the PDSCH transmission of the RACH response message based on the PDCCH transmission of the RACH response message; and
when the RACH response message is for a second mode:
monitoring in a common search space (CSS) for the PDCCH transmission scrambled by a group-specific message B (MsgB) RNTI; and
monitoring the PDSCH transmission of the RACH response message based on the PDCCH transmission of the RACH response message, wherein the PDSCH transmission includes the UE-specific C-RNTI.

2. The method of claim 1, wherein the RACH response message includes at least one of: a backoff indicator (BI), a timing advance command (TAC), a fallback random access response (RAR), a successful RAR, or a combination thereof.

3. The method of claim 1, further comprising receiving an indication to monitor the USS for the PDCCH transmission with the CRC scrambled by the UE-specific C-RNTI or to monitor the CSS for the PDCCH transmission with the CRC scrambled by the group-specific MsgB RNTI.

4. The method of claim 3, wherein the receiving the indication comprises receiving the indication in system information broadcast or radio resource control (RRC) signaling before sending the RACH message.

5. The method of claim 3, wherein the indication comprises the indication to monitor the PDCCH transmission with the CRC scrambled by the UE-specific C-RNTI when system loading is high.

6. The method of claim 5, further comprising receiving an indication to monitor a RACH response message including a PDCCH transmission with a CRC scrambled by the group-specific MsgB RNTI when system loading is low.

7. The method of claim 3, wherein the indication comprises the indication to monitor the PDCCH transmission with the CRC scrambled by the UE-specific C-RNTI when a payload of the PDCCH transmission is large.

8. The method of claim 7, further comprising receiving an indication to monitor a RACH response message including a PDCCH transmission with a CRC scrambled by the group-specific MsgB RNTI when a payload of the PDCCH transmission is small.

9. The method of claim 1, wherein the PDCCH transmission of the RACH response message further carries a physical uplink control channel (PUCCH) resource configuration for providing hybrid automatic repeat request (HARQ) feedback for the PDSCH transmission of the RACH response message.

10. The method of claim 1, wherein the PDSCH transmission of the RACH response message carries at least a timing advance command (TAC) when the UE is in a radio resource control (RRC) connected state, an RRC inactive state, or an RRC idle state.

11. The method of claim 10, wherein the PDSCH transmission of the RACH response message further carries at least one of: an RRC message or an uplink grant for new data.

12. The method of claim 10, wherein the PDSCH transmission of the RACH response message transmission further carries at least one of: an RRC message, an uplink grant for new data, or a physical uplink control channel (PUCCH) resource configuration for providing hybrid automatic repeat request (HARQ) feedback for the PDSCH transmission of the RACH response message.

13. The method of claim 1, wherein the method further comprises monitoring the PDCCH transmission of the RACH response message based on at least one of: a different control resource set (CORESET), a different search space configuration, a different quasi co-location (QCL) relation, a different demodulation reference signal (DMRS) resource configuration, or a different multiple access signature than a PDCCH transmission of a RACH response message transmission for a four-step random access procedure.

14. The method of claim 1, wherein the MsgB RNTI is calculated based on one or more RACH occasion indexes and an uplink carrier index when the UE is in a radio resource control (RRC) idle state or an RRC inactive state.

15. The method of claim 14, wherein the C-RNTI is used when the UE is in a RRC connected state.

16. The method of claim 1, wherein the PDCCH transmission of the RACH response message further includes a flag indicating the MsgB RNTI is for the RACH response message of a two-step RACH procedure.

17. The method of claim 1, further comprising determining the MsgB RNTI based on $1+s\_id+14 \times t\_id+14 \times 80 \times f\_id+$ 14×80×8×ul_carrier_id+14×80×8×2, where s_id is an index of a first orthogonal frequency division multiplexing (OFDM) symbol of a physical RACH (PRACH) occasion, t_id is an index of a first slot of the PRACH occasion, f_id is an index of the PRACH occasion in a frequency domain, and ul_carrier_id is an identifier of an uplink carrier.

18. A method for wireless communication by a base station (BS), the method comprising:
    receiving a random access channel (RACH) message, from a user equipment (UE), including a RACH preamble transmission and a physical uplink shared channel (PUSCH) transmission; and
    sending a RACH response message, to the UE, in a common search space (CSS), including a physical downlink control channel (PDCCH) transmission and a physical downlink shared channel (PDSCH) transmission, wherein sending the RACH response message includes:
    when the RACH response message is for a first mode:
        sending the PDCCH transmission of the RACH response message, in a UE specific search space (USS), with a cyclic redundancy check (CRC) scrambled by a UE-specific cell radio network temporary identifier (C-RNTI); and
        sending the PDSCH transmission of the RACH response message based on the PDCCH transmission of the RACH response message; and
    when the RACH message is for a second mode:
        sending the PDCCH transmission of the RACH response message, in a common search space (CSS), with the CRC scrambled by a group-specific message B (MsgB) RNTI; and
        sending the PDSCH transmission of the RACH response message based on the PDCCH transmission of the RACH response message, wherein the PDSCH transmission includes the UE-specific C-RNTI.

19. The method of claim 18, wherein the RACH response message includes at least one of: a backoff indicator (BI), a timing advance command (TAC), a fallback random access response (RAR), a successful RAR, or a combination thereof.

20. The method of claim 18, further comprising sending an indication to the UE to monitor the USS for the PDCCH transmission with the CRC scrambled by the UE-specific C-RNTI or to monitor the CSS for the PDCCH transmission with the CRC scrambled by the group-specific MsgB RNTI.

21. The method of claim 20, wherein the sending the indication to the UE comprises sending the indication in system information broadcast or radio resource control (RRC) signaling before receiving the RACH message from the UE.

22. The method of claim 18, wherein the PDCCH transmission of the RACH response message further carries a physical uplink control channel (PUCCH) resource configuration for providing hybrid automatic repeat request (HARQ) feedback for the PDSCH transmission of the RACH response message.

23. The method of claim 18, wherein the PDSCH transmission of the RACH response message carries at least a timing advance command (TAC) when the UE is in a radio resource control (RRC) connected state, a RRC inactive state, or an RRC idle state.

24. The method of claim 23, wherein the PDSCH transmission of the RACH response message further carries at least one of: an RRC message or an uplink grant for new data.

25. The method of claim 23, wherein the PDSCH transmission of the RACH response message transmission further carries at least one of: an RRC message, an uplink grant for new data, or a physical uplink control channel (PUCCH) resource configuration for providing hybrid automatic repeat request (HARQ) feedback for the PDSCH transmission of the RACH response message.

26. The method of claim 18, wherein the PDCCH transmission of the RACH response message is for a two-step RACH procedure and has a different control resource set (CORESET), a different search space configuration, a different quasi co-location (QCL) relation, a different demodulation reference signal (DMRS) resource configuration, or a different multiple access signature than a PDCCH transmission of a RACH response message transmission for a four-step RACH procedure.

27. A user equipment (UE) for wireless communication, the UE comprising:
    one or more memory storing computer executable code thereon; and
    one or more processors coupled to the one or more memory and configured to execute the computer executable code and, individually or collectively, cause the UE to:
    send a random access channel (RACH) message including a RACH preamble transmission and a physical uplink shared channel (PUSCH) transmission; and
    receive a RACH response message including a physical downlink control channel (PDCCH) transmission and a physical downlink shared channel (PDSCH) transmission, wherein receiving the RACH response message includes:
    when the RACH response message is for a first mode:
        monitoring in a UE specific search space (USS) for the PDCCH transmission with a cyclic redundancy check (CRC) scrambled by a UE-specific cell radio network temporary identifier (C-RNTI); and
        monitoring the PDSCH transmission of the RACH response message based on the PDCCH transmission of the RACH response message; and
    when the RACH response message is for a second mode contention based random access:
        monitoring in a common search space (CSS) for the PDCCH transmission scrambled by a group-specific message B (MsgB) RNTI; and
        monitoring the PDSCH transmission of the RACH response message based on the PDCCH transmission of the RACH response message, wherein the PDSCH transmission includes the UE-specific C-RNTI.

28. A base station (BS) for wireless communication, the BS comprising:
    one or more memory storing computer executable code thereon; and
    one or more processors coupled to the one or more memory and configured to execute the computer executable code and, individually or collectively, cause the BS to:
    receive a random access channel (RACH) message, from a user equipment (UE), including a RACH preamble transmission and a physical uplink shared channel (PUSCH) transmission; and
    send a RACH response message, to the UE, in a common search space (CSS), including a physical downlink control channel (PDCCH) transmission and a physical downlink shared channel (PDSCH) transmission, wherein sending the RACH response message includes:

when the RACH response message is for a first mode:
- sending the PDCCH transmission of the RACH response message, in a UE specific search space (USS), with a cyclic redundancy check (CRC) scrambled by a UE-specific cell radio network temporary identifier (C-RNTI); and
- sending the PDSCH transmission of the RACH response message based on the PDCCH transmission of the RACH response message; and when the RACH message is for a second mode:
- sending the PDCCH transmission of the RACH response message, in a common search space (CSS), with the CRC scrambled by a group-specific message B (MsgB) RNTI; and
- sending the PDSCH transmission of the RACH response message based on the PDCCH transmission of the RACH response message, wherein the PDSCH transmission includes the UE-specific C-RNTI.

* * * * *